May 26, 1959 L. G. HOGSTEN 2,888,269
VEHICLE FRAME
Filed Dec. 12, 1956 2 Sheets-Sheet 1

INVENTOR.
Leslie Glenn Hogsten
BY
ATTORNEY.

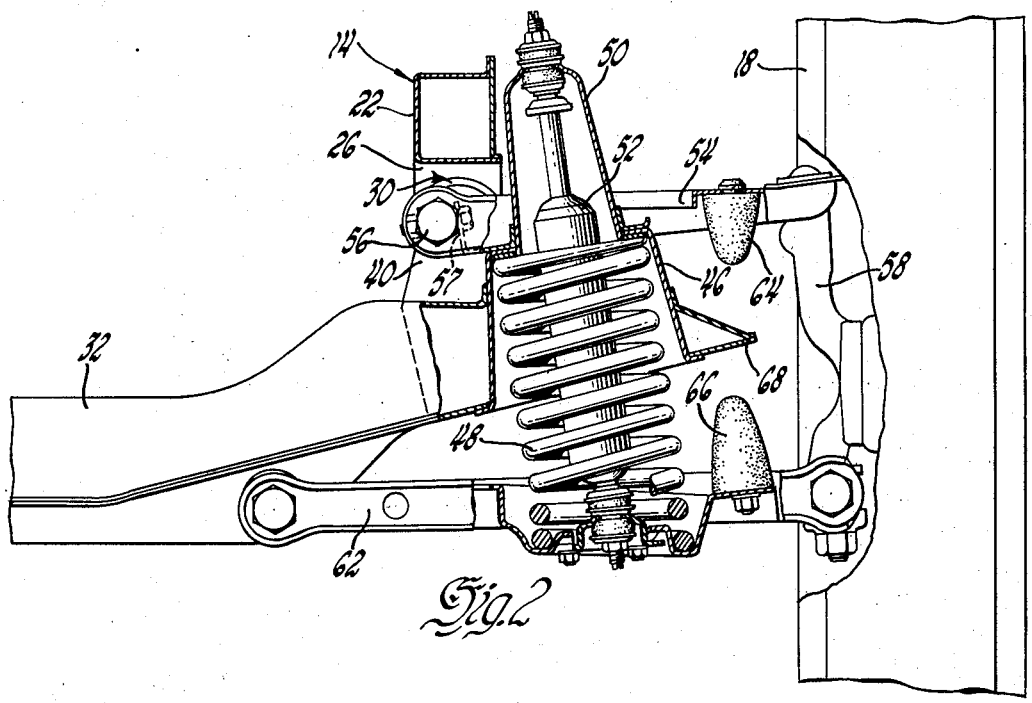
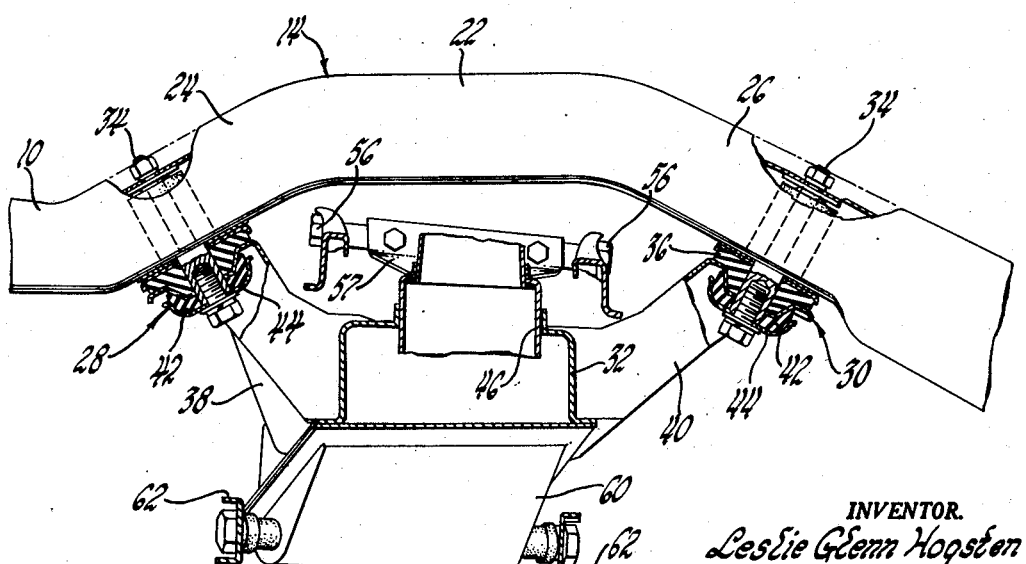

_United States Patent Office_

2,888,269
Patented May 26, 1959

2,888,269
VEHICLE FRAME

Leslie Glenn Hogsten, Birmingham, Mich., assignor to General Motors Corporation, Detroit, Mich., a corporation of Delaware Application December 12, 1956, Serial No. 627,864

5 Claims. (Cl. 280—106.5)

The invention relates to a vehicle frame and more particularly to that part of the frame which has an independent suspension system connected thereto.

In suspensions having upper and lower control arms for supporting the steering knuckle, it is advantageous to have a relatively long upper control arm to obtain a more desirable suspension geometry. Since the inner end of the upper control arm is usually pivoted on the vehicle frame, the space allowed between the frame side rails and the wheel determines the maximum length of that arm. When the vehicle is manufactured with a narrow tread, this space dictates undesirable limitations. The invention permits the use of longer upper control arms than heretofore without sacrifice of tread or frame space. The space between the frame side rails and wheels is not a limitation upon the maximum length of the upper control arm when a vehicle arm embodying the invention is used.

In order to accomplish this result, the vehicle frame side rails each have a portion adjacent the wheels which is raised upwardly above the side rail longitudinal axis. A frame cross member may be mounted to extend under and be vertically spaced from this section. The cross member may be resiliently mounted to the frame, and provides an anchorage for the inner ends of the upper and lower control arms. The upper control arm is pivotally anchored intermediate the cross member and the frame side rail, allowing a longer upper control arm to be used.

In the drawings:

Figure 2 is a partial view of one of the wheel suspensions as taken in the direction of arrow 2—2 of Figure 1 and having parts broken away and in section.

Figure 3 is an elevation view of the cross member for one side rail showing the mounting of the member to the rail, having parts broken away and in section.

Figure 1:
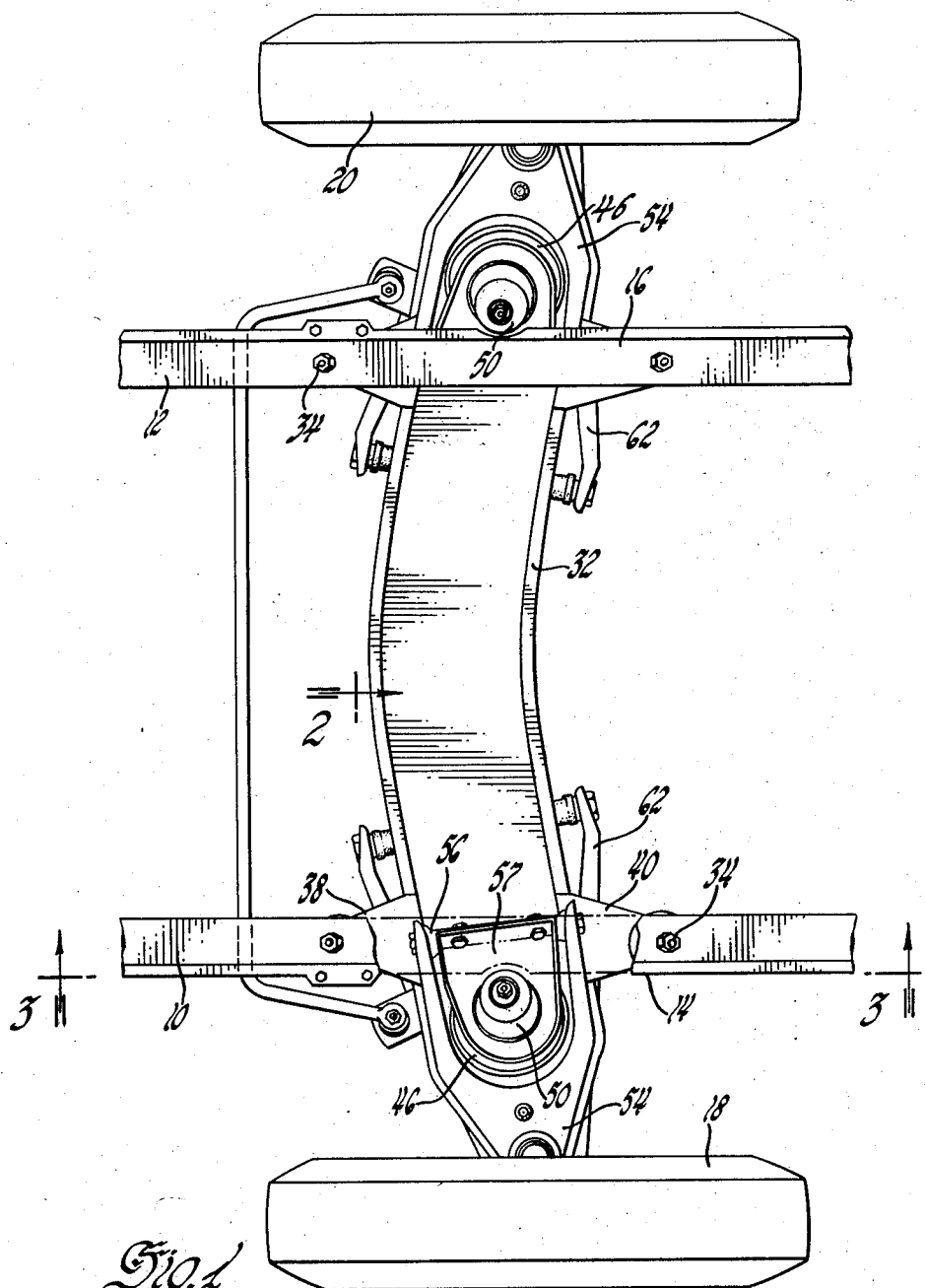
Figure 1 is a plan view of the front suspension and fragmentary portions of the frame side rails of an automotive vehicle embodying the invention.

While the invention is equally applicable to the front and rear wheel suspension systems which have independently suspended wheels, it is illustrated and described as being embodied in a front suspension system. The vehicle frame includes side rails 10 and 12 and has kick-up portions 14 and 16 formed therein adjacent the front wheels 18 and 20. The kick-up portions may be formed in elevation as shown in Figure 3 with a high horizontal center portion 22 and angularly disposed approach sections 24 and 26.

Since the wheels on either side of the vehicle are similarly supported, only one side of the frame and suspension system will be described in detail. The approach sections 24 and 26 are provided with mounting brackets 28 and 30 for resiliently mounting cross member 32 to the frame side rail 10. Each of these mounting brackets may be comprised of a through bolt 34, a first resilient pad 36 which is located intermediate cross member brackets 38 and 40, respectively, and a second resilient pad 42 which is held in place against the respective brackets 38 and 40 by a cap 44. Through bolt 34 passes through aligned apertures in these members and holds them in position.

Brackets 38 and 40 extend downwardly and outwardly from side rail 10 and are rigidly secured to the end of the cross member 32. The outer end of cross member 32 has a receptacle and stop 46 for coil spring 48 formed therein and extending in a generally vertical direction. The upper side of receptacle 46 is provided with a cup or dome shaped member 50 which provides an upper mount for shock absorber 52. Upper control arm 54 is pivoted at 56 to an extension 57 of the spring receptacle 46. This arm may be of the so-called wishbone figuration and has a leg passing on either side of the shock absorber housing 50. The outer end of control arm 54 is pivotally connected to steering knuckle 58 which in turn has the wheel stub axle formed therewith.

A depending portion 60 of the cross member 32 provides a pivotal support for the inner end of the lower control arm 62. The arm extends laterally of the vehicle to steering knuckle 58 and is pivotally secured to the lower end of that knuckle. Rebound bumper 64 and compression bumper 66 are respectively secured to the adjacent faces of the upper and lower control arms 54 and 62. The extreme end of cross member 32 is provided with a bumper contact member 68. Bumpers 64 and 66 are adapted to engage either side of that member upon sufficient movement up or down of the wheel 18 relative to cross member 32.

As is best shown in Figure 2, upper control arm 54 has its inner end pivotally secured to a point intermediate cross member 32 and the horizontal section 22 of rail 10. If it is desired to have a still longer upper control arm, this pivot may be moved further inward to provide a mounting for such an arm. The inner mounting for this arm is semi-rigidly secured to the vehicle frame through the bracket 57, receptacle 46, cross member brackets 38 and 40 and mounting brackets 28 and 30. The resilient pads in mounting brackets 28 and 30 aid in isolating road shocks and preventing vibration transmission through the suspension system to the side rail 10.

A frame and suspension system has thus been disclosed with the cross member supported below the vehicle frame in a manner permitting one of the suspension control arms to be disposed between the frame and the cross member. This arrangement permits the use of a relatively long upper control arm and is particularly adapted to narrow tread vehicles.

What is claimed is:

1. A frame and a suspension system for independently suspending a wheel, said suspension system including upper and lower control arms pivotally mounted on said frame and resilient support means interconnecting one of said arms and said frame, said frame including a side rail and a cross member secured to said rail in vertically spaced relation thereto and mounts for said control arms, one of said mounts being intermediate said cross member and said rail, said support means extending through said cross member transversely intermediate said frame side rail and said wheel.

2. In combination in a motor vehicle frame and suspension system, a side frame member, a cross member resiliently secured thereto, upper and lower suspension control arms pivotally secured to said cross member, and means for resiliently absorbing forces exerted on said arms, said side frame member having a raised portion, said cross member having upwardly extending and diverging brackets for securing said cross member to said side frame member below said raised portion in spaced relation thereto, said cross member extending laterally beyond said side member and having a bracket member outward of said side frame member and extending thereabove and receiving said resilient absorbing means substantially vertical to said cross member and through and beyond said cross member, said control arms being pivotally secured to said cross member laterally and inwardly of the vertical centerline of said side frame member and underneath said side frame member raised portion.

3. In a vehicle frame and suspension assembly, a frame having a pair of substantially parallel side rails formed to provide adjacent rail raised portions extending upwardly above the horizontal plane of the rails to provide suspension control arm clearance thereunder defined by said raised portions and oppositely inclined portions connected therewith, an integral cross member having a pair of brackets formed thereon adjacent each end, said brackets extending upwardly above said cross member and oppositely outward therefrom and resiliently secured to said oppositely inclined rail portions to mount said cross member at a substantial distance underneath said raised rail portions whereby said clearance is maintained, upper control arm mounting brackets operatively secured to and adjacent each end of said cross member and extending upwardly under said rail raised portions and having an upper control arm pivot positioned inwardly of the center line of said rail raised portions, and lower control arm pivot connections integrally formed with said cross member at transversely spaced points positioned inwardly of said rails.

4. The assembly of claim 3, said cross member extending outwardly beyond said rails and having mountings for resilient and shock absorbing suspension means secured thereto and extending upwardly to and outwardly of said rail raised portions.

5. In combination in a vehicle frame and suspension system, a side frame rail, a frame cross member secured below said rail in spaced relation thereto and extending transversely and outwardly therebeyond, an upper control arm pivotally secured to the upper side of said cross member intermediate said side rail and said cross member and extending transversely and inwardly of said side rail, a lower control arm pivotally secured to the lower side of said cross member and extending transversely and inwardly of said side rail, resilient means mounted on said control arms and engageable with said cross member transversely outward of said side rail for bumping action, and shock absorbing means extending vertically through and beyond said cross member and said control arms and beyond and outwardly of said frame side rail and operatively secured to said cross member and one of said control arms.

References Cited in the file of this patent
UNITED STATES PATENTS

| | | |
|---|---|---|
| 2,069,924 | Paton | Feb. 9, 1937 |
| 2,636,749 | Vahey | Apr. 28, 1953 |
| 2,757,016 | Adloff | July 31, 1956 |

FOREIGN PATENTS

| | | |
|---|---|---|
| 1,122,484 | France | May 22, 1956 |